(12) United States Patent
Yue

(10) Patent No.: US 6,649,880 B2
(45) Date of Patent: Nov. 18, 2003

(54) HEATING ROLLER DEVICE WITH A HEATING ELEMENT DISPOSED IN A ROLLER BODY

(76) Inventor: Steven Yue, 4F, No. 7, Lane 180, Sec. 2, Yen-Chiu-Yuan Rd., Taipei City (TW)

( * ) Notice: Subject to any disclaimer, the term of this patent is extended or adjusted under 35 U.S.C. 154(b) by 37 days.

(21) Appl. No.: 10/105,202
(22) Filed: Mar. 25, 2002

(65) Prior Publication Data
US 2003/0178407 A1 Sep. 25, 2003

(51) Int. Cl.[7] .............................. H05B 3/42; B30B 15/34
(52) U.S. Cl. ..................... 219/469; 156/582; 156/583.1
(58) Field of Search ....................... 219/469; 156/582, 156/583.1, 583.7

(56) References Cited

U.S. PATENT DOCUMENTS

| | | | | |
|---|---|---|---|---|
| 5,445,700 A | * | 8/1995 | Uang | 156/583.1 |
| 5,885,410 A | * | 3/1999 | Berkan | 156/582 |
| 6,285,006 B1 | * | 9/2001 | Hyllberg | 219/216 |
| 6,435,246 B1 | * | 8/2002 | Kerr | 156/582 |
| 2003/0102300 A1 | * | 6/2003 | Lin | 219/469 |

* cited by examiner

Primary Examiner—Joseph Pelham
(74) Attorney, Agent, or Firm—Trop, Pruner & Hu, P.C.

(57) ABSTRACT

A heating roller device is used to fix a film to a sheet in a laminator, and has two heating rollers. Each of the rollers includes a hollow support shaft, a roller body disposed rotatably around the support shaft, and a heating element disposed in the roller body. An electrical wire extends into the support shaft, and is in electrical connection with the heating element.

10 Claims, 3 Drawing Sheets

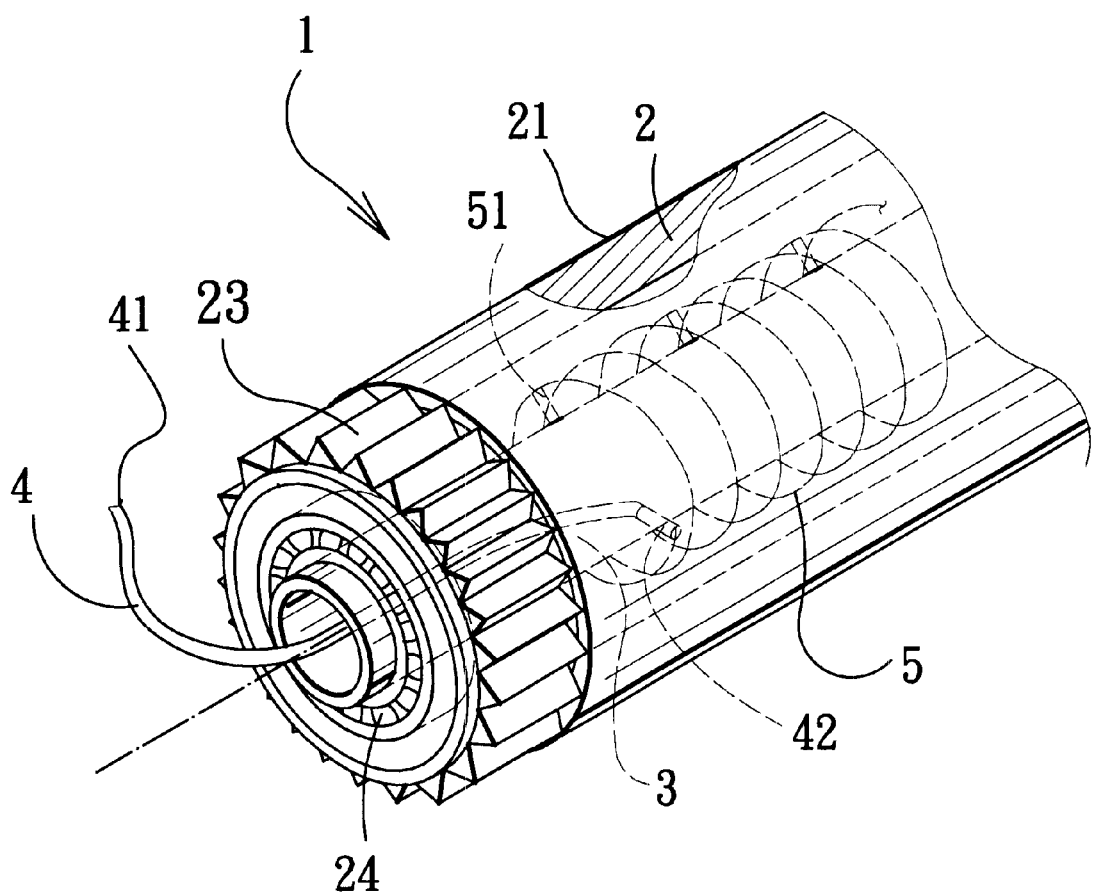
F I G. 5

HEATING ROLLER DEVICE WITH A HEATING ELEMENT DISPOSED IN A ROLLER BODY

BACKGROUND OF THE INVENTION

1. Field of the Invention

This invention relates to a heating roller device for a laminator that is used to fix a plastic protective film onto a sheet, such as a photograph, and more particularly to a heating roller device, which includes a heating element that is disposed in a roller for heating the roller by radiation.

2. Description of the Related Art

Referring to FIG. 1, a first conventional laminator is shown to include a heating roller device that consists of two heating rollers 7, and two heating elements 8 for heating the rollers 7, respectively. The rollers 7 are driven by a driving unit (not shown) to rotate in opposite directions. A plastic protective film 91 and a sheet 9, which are superposed, are fed into a space between the rollers 7. As such, the film 91 and the sheet 9 can move between the rollers 7, thereby fixing the film 91 to the sheet 9 under heat and pressure. However, air voids are formed between the film 91 and the sheet 9 during the heat pressing process. Referring to FIG. 2, a second conventional laminator solves this problem, and is shown to include a pair of front rollers 71, a pair of rear rollers 72, and a pair of heating elements 8' that are disposed between the front and rear rollers 71, 72. The assembly of the film 91 and the sheet 9 is fed into a space between the front rollers 71 so as to discharge air from a space between the film 91 and the sheet 9. Thereafter, the assembly is moved and heated between the heating elements 8', and is subsequently fed into a space between the rear rollers 72, thereby interconnecting the film 9 and the sheet 91 fixedly under pressure.

Referring to FIGS. 1 and 2, because the heating elements 8, 8' are disposed outside the rollers 7, 71, 72, the heating efficiency is relatively poor. Moreover, the heating elements 8, 8' occupy much space in the conventional laminators.

SUMMARY OF THE INVENTION

The object of this invention is to provide a heating roller device for a laminator, which includes a heating element that is disposed in a roller, thereby increasing the heating efficiency and reducing the volume of the laminator.

According to this invention, a heating roller device is used to fix a film to a sheet in a laminator, and has two heating rollers. Each of the rollers includes a hollow support shaft, a roller body disposed rotatably around the support shaft, and a heating element disposed in the roller body. An electrical wire extends into the support shaft, and is in electrical connection with the heating element.

Preferably, the roller body is coated with a soft wear-resistant material, such as TEFLON, that is in tight engagement with the assembly of the film and the sheet so as to prevent formation of air voids between the film and the sheet.

BRIEF DESCRIPTION OF THE DRAWINGS

These and other features and advantages of this invention will become apparent in the following detailed description of a preferred embodiment of this invention, with reference to the accompanying drawings, in which:

FIG. 5 is a fragmentary perspective view of a roller of the preferred embodiment.

DETAILED DESCRIPTION OF THE PREFERRED EMBODIMENT

Figure 1:
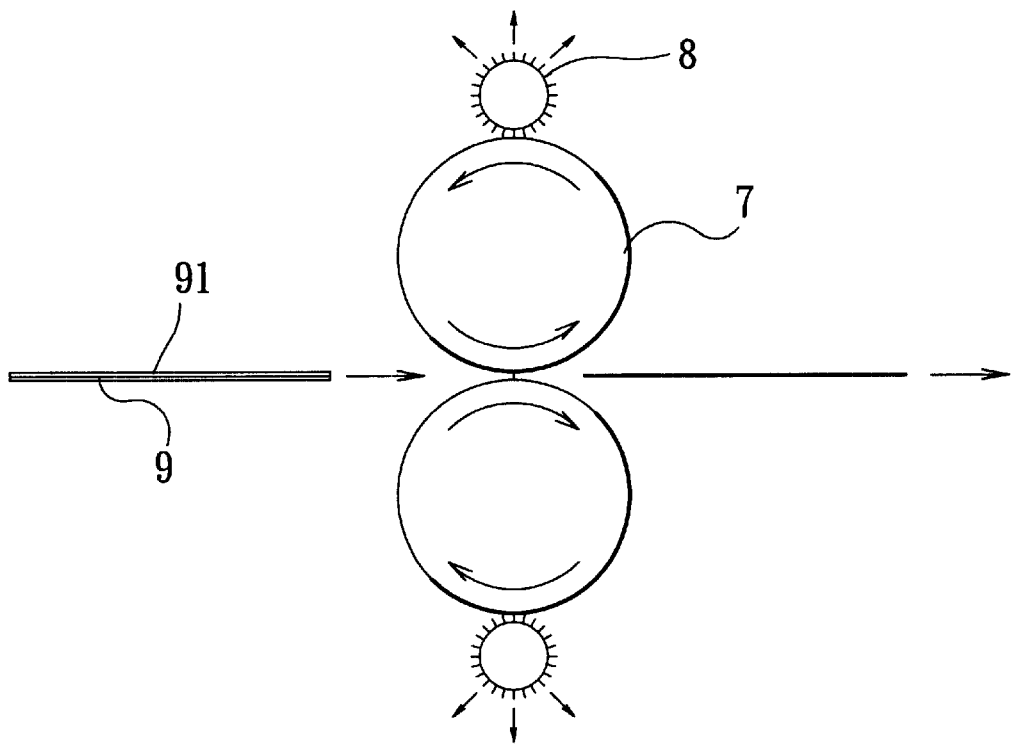
FIG. 1 is a schematic side view of a heating roller device of a first conventional laminator.
Figure 2:
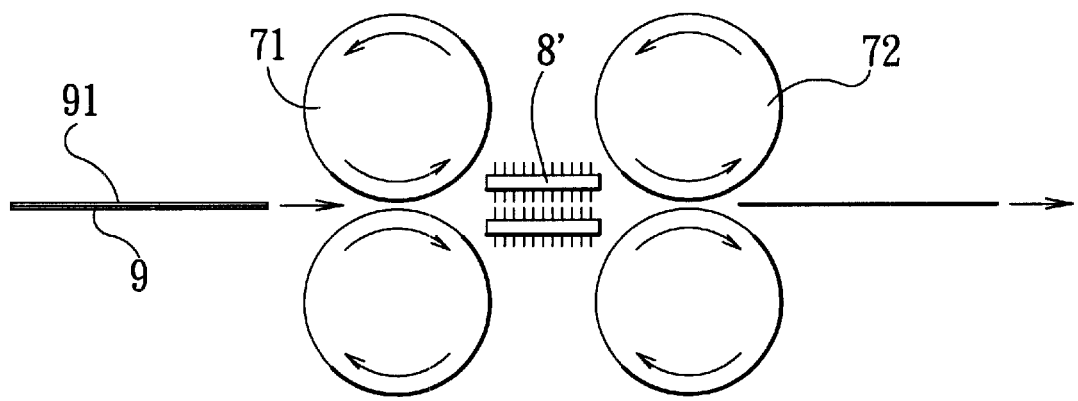
FIG. 2 is a schematic side view of rollers and heating elements of a second conventional laminator.
Figure 3:
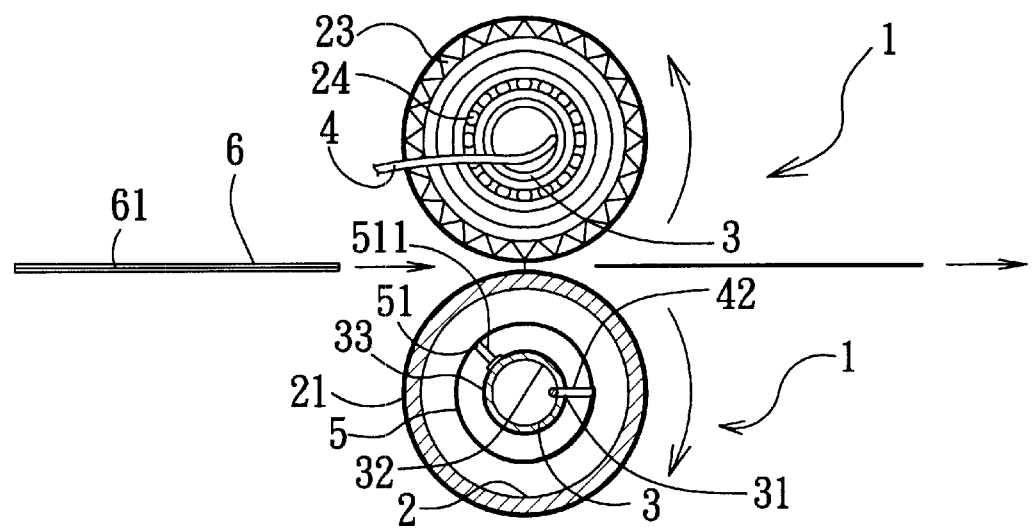
FIG. 3 is a schematic side view of the preferred embodiment of a heating roller device according to this invention.

Referring to FIG. 3, the preferred embodiment of a heating roller device for a laminator according to this invention is shown to have two heating rollers 1 that are spaced apart from each other and that are rotatable in opposite directions. Each of the rollers 1 includes a hollow roller body 2, a hollow support shaft 3, an electrical wire 4, and a heating element 5. A superposed assembly of a plastic protective film 6 and a sheet 61, such as a photograph, is moved between the rollers 1. Alternatively, the superposed assembly can include two films 6 and a sheet 61 that is sandwiched between the films 6.

Figure 4:
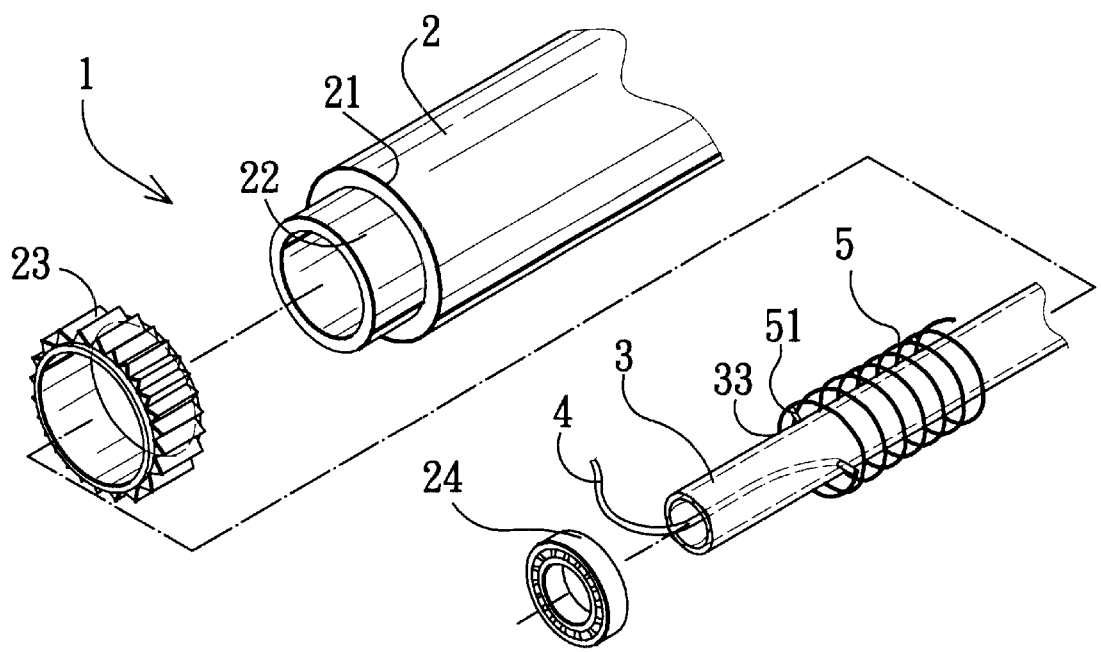
FIG. 4 is a fragmentary exploded perspective view of the preferred embodiment.

Because the rollers 1 are similar in construction, the structure of only one roller 1 will be described hereinafter. Referring to FIGS. 3, 4, and 5, the support shaft 3 has two ends that are adapted to be fixed in the laminator. The roller body 2 is coated with a soft wear-resistant material 21, e.g., TEFLON, which is in tight engagement with the superposed assembly of the film 6 and the sheet 61, thereby preventing formation of air voids between the film 6 and the sheet 61. A driven gear 23 is sleeved fixedly on an end 22 of the roller 2 so as to engage a driving gear (not shown) on a motor shaft (not shown) of a motor (not shown) that serves as a driving unit. The roller body 2 is mounted rotatably around the support shaft 3 by means of two bearings 24, which are disposed respectively within two ends of the roller body 2 and which are sleeved respectively on two ends of the support shaft 3.

The electrical wire 4 extends into the support shaft 3, and has an input end 41 that is adapted to be in electrical connection with a power supply (not shown), and an output end 42.

The heating element 5 is configured as a coil, is disposed around the support shaft 3 within the roller body 2, and has an end that is in electrical connection with the output end 42 of the electrical wire 4 so that heat is radiated radially and outwardly from the heating element 5 to the roller body 3 when electricity is supplied from the power supply (not shown) to the heating element 5 via the electrical wire 4. Preferably, the heating element 5 is adjacent to and is spaced apart from an inner surface of the roller body 2. The output end 42 of the electrical wire 4 extends outward from a radially extending hole 31 in the support shaft 3 so as to connect with the heating element 5.

The coil can be replaced with a PTC (Positive Temperature Coefficient) resistor, a quartz heating tube, a heating plate, or a heating element that is made of a material capable of converting electrical energy into heat energy and that can be composed of a plurality of interconnected heating bodies.

The heating element 5 is spaced apart from the support shaft 3 by means of an electrically insulating spacer unit, which includes a plurality of rigid connecting rods 51 that are spaced along an axial direction of the support shaft 3 and that extend along a radial direction of the support shaft 3. Each of the connecting rods 51 has an inner end that is connected fixedly to the support shaft 3, e.g., by solder, bolt, or adhesive, an outer end that is connected fixedly to the heating element 5, e.g., by solder, bolt, or adhesive, and an electrically insulating portion 511 that is disposed between the inner and outer ends so as to prevent electrical connection between the support shaft 3 and the heating element 5 via the connecting rods 51.

The support shaft 3 includes a shaft body 32, and a heat-insulating material 33 that is coated on the shaft body 32 and that is disposed between the shaft body 3 and the connecting rods 51 so as to prevent heat conduction from the heating element 5 to the shaft body 32 via the connecting rods 51.

Because the heating elements 5 are disposed in the rollers 1, the heating efficiency of the heating elements 5 is increased and the volume of the heating roller device is reduced significantly.

With this invention thus explained, it is apparent that numerous modifications and variations can be made without departing from the scope and spirit of this invention. It is therefore intended that this invention be limited only as indicated by the appended claims.

I claim:

1. A heating roller device for fixing a film to a sheet in a laminator, the laminator including a power supply and a driving unit, said heating roller device comprising two rollers that are spaced apart from each other and that are rotatable in opposite directions so that the film and the sheet can be superposed, clamped, and moved between said rollers, each of said rollers including:

a hollow support shaft adapted to be fixed in the laminator;

a hollow roller body disposed rotatably around said support shaft and adapted to be rotated by the driving unit;

an electrical wire extending into said support shaft and having an input end that is adapted to be in electrical connection with the power supply, and an output end; and a heating element disposed within said roller body and in electrical connection with said output end of said electrical wire so that heat is radiated from said heating element to said roller body when electricity is supplied from the power supply to said heating element via said electrical wire.

2. A heating roller for a laminator, the laminator including a power supply and a driving unit, said heating roller comprising:

a hollow support shaft adapted to be fixed in the laminator;

a hollow cylindrical roller body disposed rotatably around said support shaft and adapted to be rotated by the driving unit;

an electrical wire extending into said support shaft and having an input end that is adapted to be in electrical connection with the power supply, and an output end; and a heating element disposed in said roller body and in electrical connection with said output end of said electrical wire so that heat is radiated from said heating element to said roller body when electricity is supplied from the power supply to said heating element via said electrical wire.

3. The heating roller device as claimed in claim 2, wherein said roller body is coated with a soft wear-resistant material.

4. The heating roller device as claimed in claim 3, wherein said wear-resistant material is TEFLON.

5. The heating roller device as claimed in claim 2, wherein said roller body includes two bearings that are disposed respectively within two ends thereof and that are sleeved respectively on two ends of said support shaft.

6. The heating roller device as claimed in claim 2, wherein said heating element is configured as a coil, and is disposed around said support shaft.

7. The heating roller device as claimed in claim 6, wherein said support shaft has a radially extending hole formed therethrough, said output end of said electrical wire extending outward from said support shaft via said hole and being in electrical connection with an end of said heating element.

8. The heating roller device as claimed in claim 6, further comprising an electrically insulating spacer unit for spacing said heating element from said support shaft.

9. The heating roller device as claimed in claim 8, wherein said spacer unit includes a plurality of rigid connecting rods that are spaced along an axial direction of said support shaft and that extend along a radial direction of said support shaft, each of said connecting rods having an inner end that is connected fixedly to said support shaft, an outer end that is connected fixedly to said heating element, and an electrically insulating portion that is disposed between said inner and outer ends so as to prevent electrical connection between said support shaft and said heating element via said connecting rods.

10. The heating roller device as claimed in claim 9, wherein said support shaft includes a shaft body, and a heat-insulating material that is coated on said shaft body and that is disposed between said shaft body and said connecting rods so as to prevent heat conduction from said heating element to said shaft body via said connecting rods.

* * * * *